United States Patent
Abotabl et al.

(10) Patent No.: US 12,477,458 B2
(45) Date of Patent: Nov. 18, 2025

(54) DELAYED CELL WAKE-UP IN RESPONSE TO A CELL WAKE-UP SIGNAL

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 18/045,610

(22) Filed: Oct. 11, 2022

(65) Prior Publication Data

US 2024/0121711 A1     Apr. 11, 2024

(51) Int. Cl.
*H04W 52/02*     (2009.01)

(52) U.S. Cl.
CPC ............................... *H04W 52/0206* (2013.01)

(58) Field of Classification Search
CPC .......... H04W 52/0206; H04W 52/0235; Y02D 30/70
See application file for complete search history.

(56) References Cited

U.S. PATENT DOCUMENTS

2016/0374019 A1* 12/2016 Park .................. H04L 5/0053

FOREIGN PATENT DOCUMENTS

| GB | 2625108 A | * | 6/2024 | ............ H04W 48/16 |
| WO | WO-2023237173 A1 | * | 12/2023 | ............ H04W 48/20 |

OTHER PUBLICATIONS

International Search Report and Written Opinion—PCT/US2023/072723—ISA/EPO—Dec. 19, 2023.
Qualcomm Incorporated: "Network Energy Saving Techniques", 3GPP TSG RAN WG1 #110, R1-2207246, 3rd Generation Partnership Project (3GPP), Mobile Competence Centre, 650, Route Des Lucioles, F-06921 Sophia-Antipolis Cedex, France, vol. RAN WG1, No. Toulouse, France, Aug. 22, 2022-Aug. 26, 2022, 25 Pages, Aug. 13, 2022, XP052275182, Section 5.2.3, The Whole Document.

* cited by examiner

*Primary Examiner* — Joseph E Dean, Jr.
(74) *Attorney, Agent, or Firm* — Harrity & Harrity, LLP

(57) ABSTRACT

Various aspects of the present disclosure generally relate to wireless communication. In some aspects, a user equipment (UE) may transmit, in a cell wake-up occasion associated with a network node that is operating in a power saving mode, a cell wake-up signal (C-WUS) that indicates a latency tolerance priority associated with the UE. The UE may communicate with the network node based at least in part on the network node transitioning from operating in the power saving mode to operating in an active mode. Numerous other aspects are described.

26 Claims, 9 Drawing Sheets

DELAYED CELL WAKE-UP IN RESPONSE TO A CELL WAKE-UP SIGNAL

FIELD OF THE DISCLOSURE

Aspects of the present disclosure generally relate to wireless communication and to techniques and apparatuses for delayed cell wake-up in response to a cell wake-up signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to transmit, in a cell wake-up occasion associated with a network node that is operating in a power saving mode, a cell wake-up signal (C-WUS) that indicates a latency tolerance priority associated with the UE. The one or more processors may be configured to communicate with the network node based at least in part on the network node transitioning from operating in the power saving mode to operating in an active mode.

Some aspects described herein relate to an apparatus for wireless communication at a network node. The apparatus may include a memory and one or more processors coupled to the memory. The one or more processors may be configured to cause the network node to transition from an active mode to a power saving mode. The one or more processors may be configured to cause the network node to receive, during a cell wake-up occasion associated with the power saving mode, a C-WUS that indicates a latency tolerance priority associated with a UE. The one or more processors may be configured to cause the network node to communicate with the UE based at least in part on transitioning from operating in the power saving mode to operating in the active mode.

Some aspects described herein relate to a method of wireless communication performed by an apparatus of a UE. The method may include transmitting, in a cell wake-up occasion associated with a network node that is operating in a power saving mode, a C-WUS that indicates a latency tolerance priority associated with the UE. The method may include communicating with the network node based at least in part on the network node transitioning from operating in the power saving mode to operating in an active mode.

Some aspects described herein relate to a method of wireless communication performed by an apparatus of a network node. The method may include transitioning from an active mode to a power saving mode. The method may include receiving, during a cell wake-up occasion associated with the power saving mode, a C-WUS that indicates a latency tolerance priority associated with a UE. The method may include communicating with the UE based at least in part on transitioning from operating in the power saving mode to operating in the active mode.

Some aspects described herein relate to a non-transitory computer-readable medium that stores a set of instructions for wireless communication by an apparatus. The set of instructions, when executed by one or more processors of the apparatus, may cause the apparatus to transmit, in a cell wake-up occasion associated with a network node that is operating in a power saving mode, a C-WUS that indicates a latency tolerance priority associated with a UE. The set of instructions, when executed by one or more processors of the apparatus, may cause the apparatus to communicate with the network node based at least in part on the network node transitioning from operating in the power saving mode to operating in an active mode.

Some aspects described herein relate to a non-transitory computer-readable medium that stores a set of instructions for wireless communication by an apparatus. The set of instructions, when executed by one or more processors of the apparatus, may cause the apparatus to transition from an active mode to a power saving mode. The set of instructions, when executed by one or more processors of the apparatus, may cause the apparatus to receive, during a cell wake-up occasion associated with the power saving mode, a C-WUS that indicates a latency tolerance priority associated with a UE. The set of instructions, when executed by the one or more processors of the apparatus, may cause the apparatus to communicate with the UE based at least in part on transitioning from operating in the power saving mode to operating in the active mode.

Some aspects described herein relate to an apparatus for wireless communication. The apparatus may include means for transmitting, in a cell wake-up occasion associated with a network node that is operating in a power saving mode, a C-WUS that indicates a latency tolerance priority associated with the UE. The apparatus may include means for communicating with the network node based at least in part on the network node transitioning from operating in the power saving mode to operating in an active mode.

Some aspects described herein relate to an apparatus for wireless communication. The apparatus may include means for transitioning from an active mode to a power saving mode. The apparatus may include means for receiving, during a cell wake-up occasion associated with the power saving mode, a C-WUS that indicates a latency tolerance priority associated with a UE. The apparatus may include means for communicating with the UE based at least in part on transitioning from operating in the power saving mode to operating in the active mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
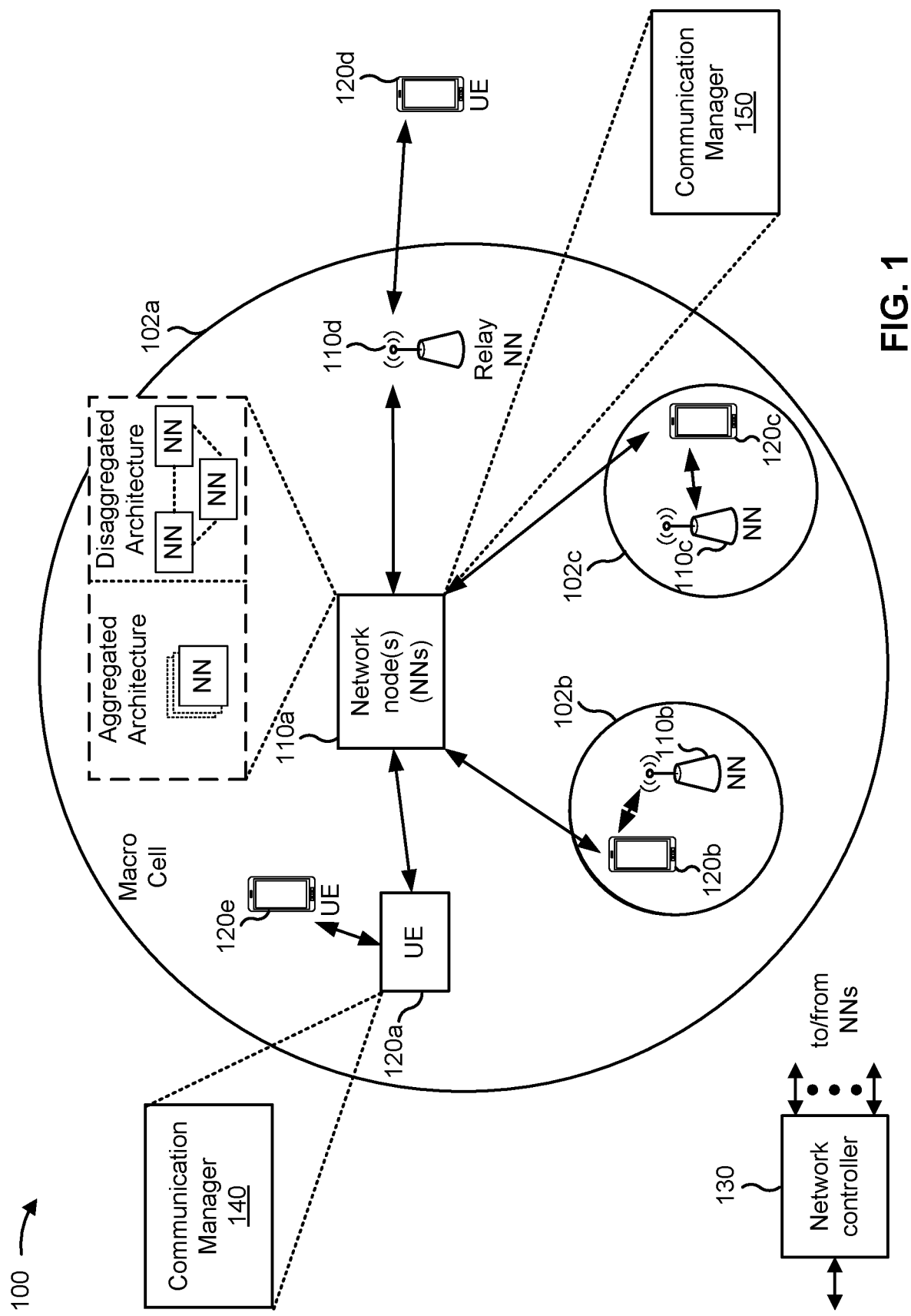
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit, in a cell wake-up occasion associated with a network node that is operating in a power saving mode, a cell wake-up signal (C-WUS) that indicates a latency tolerance priority associated with the UE; and communicate with the network node based at least in part on the network node transitioning from operating in the power saving mode to operating in an active mode. Additionally, or alternatively, the communication manager 140 may perform one or more other operations described herein.

In some aspects, a network node (e.g., the network node 110) may include a communication manager 150. As described in more detail elsewhere herein, the communication manager 150 may transition from an active mode to a power saving mode; receive, during a cell wake-up occasion associated with the power saving mode, a C-WUS that indicates a latency tolerance priority associated with a UE; and communicate with the UE based at least in part on transitioning from operating in the power saving mode to operating in the active mode. Additionally, or alternatively, the communication manager 150 may perform one or more other operations described herein.

As indicated above, FIG. 1 is provided as an example. Other examples may differ from what is described with regard to FIG. 1.

Figure 2:
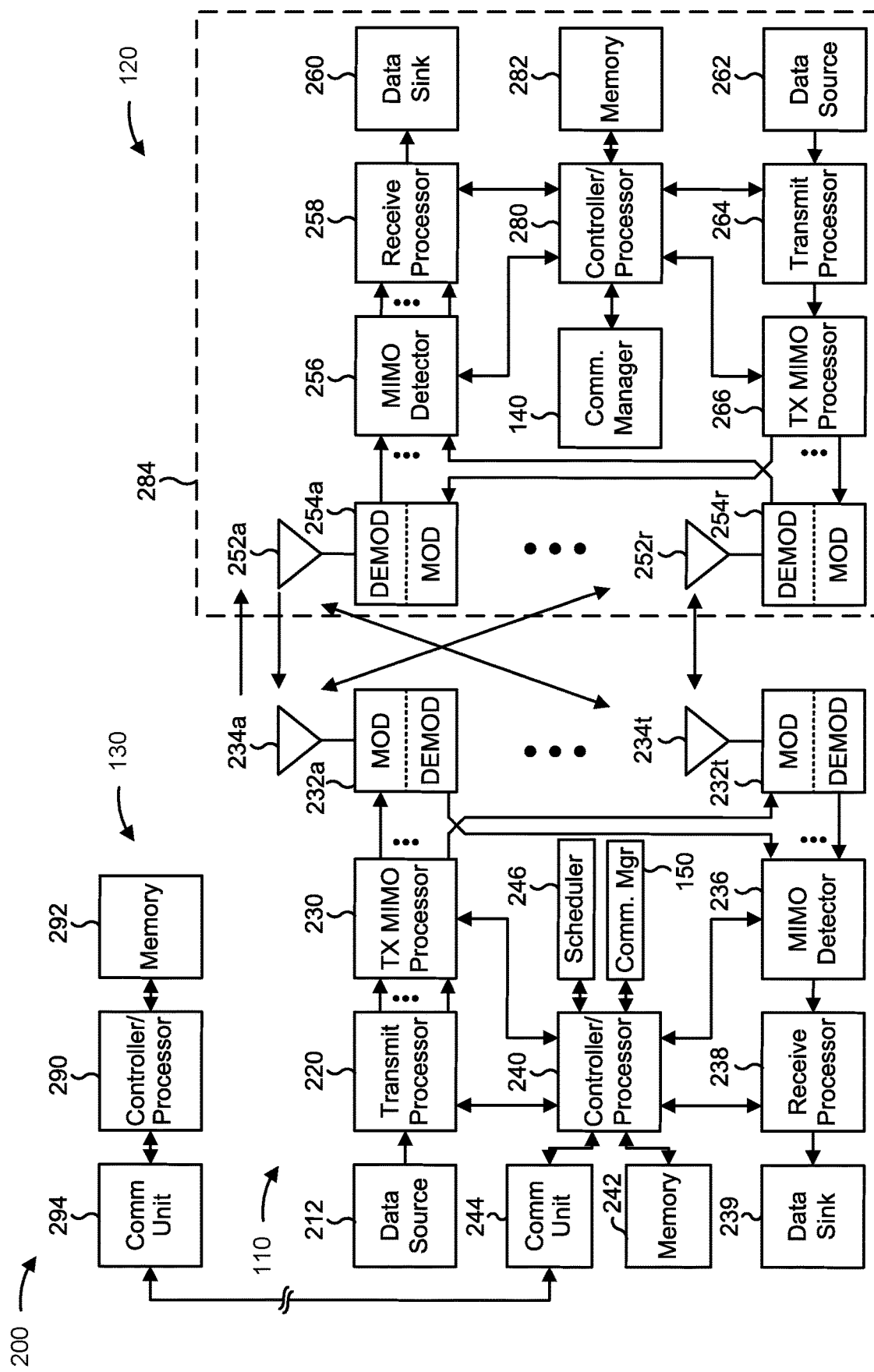
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with delayed cell wake-up in response to a cell wake-up signal, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, in a cell wake-up occasion associated with a network node that is operating in a power saving mode, a C-WUS that indicates a latency tolerance priority associated with the UE; and/or means for communicating with the network node based at least in part on the network node transitioning from operating in the power saving mode to operating in an active mode. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transitioning from an active mode to a power saving mode; means for receiving, during a cell wake-up occasion associated with the power saving mode, a C-WUS that indicates a latency tolerance priority associated with a UE; and/or means for communicating with the UE based at least in part on transitioning from operating in the power saving mode to operating in the active mode. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
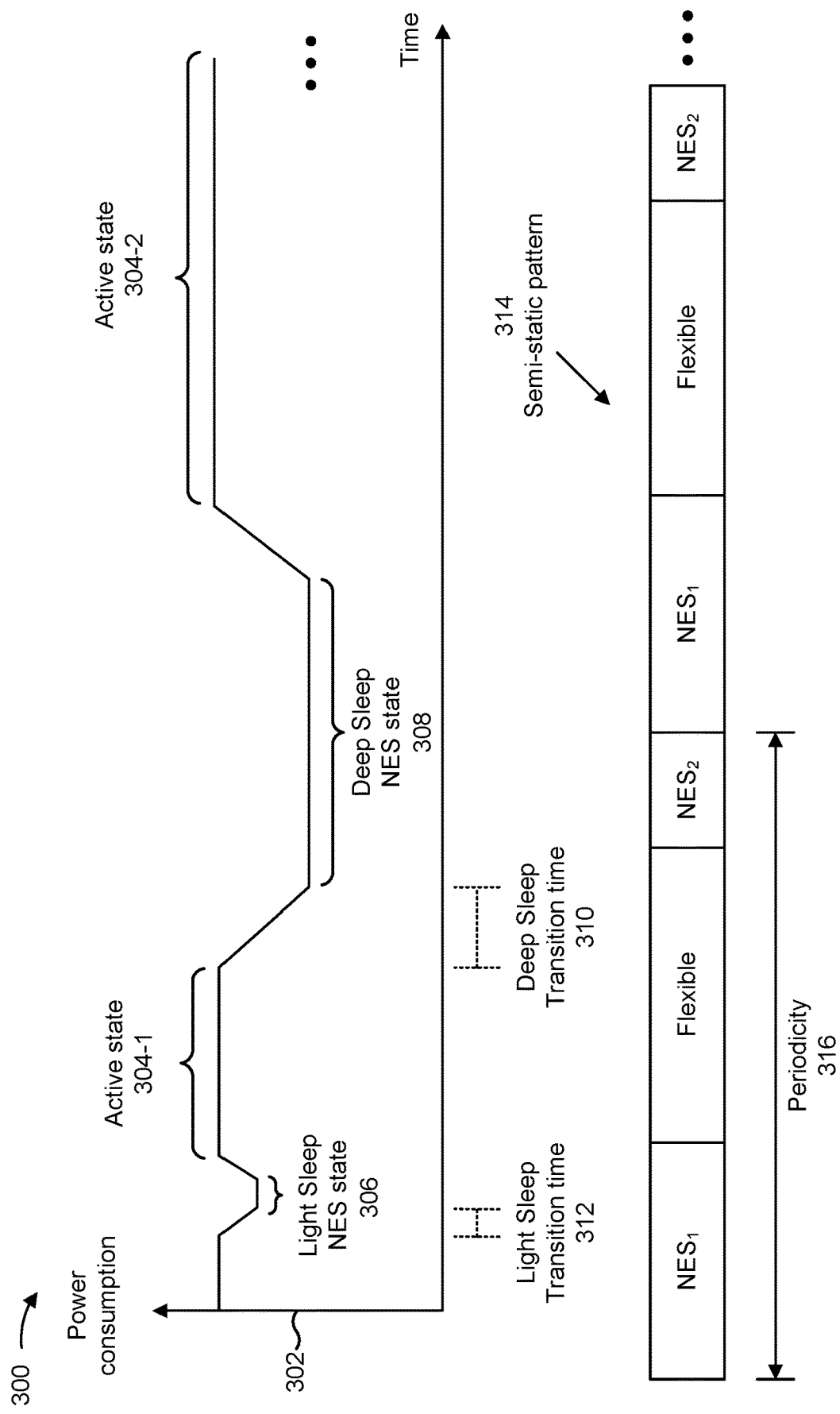
FIG. 3 is a diagram illustrating an example of a power saving operation, in accordance with the present disclosure.

FIG. 3 is a diagram illustrating an example 300 of a power saving operation, in accordance with the present disclosure. Network energy saving (NES) and/or network energy efficiency measures are expected to have increased importance in wireless network operations for various reasons, including climate change mitigation, environmental sustainability, and network cost reduction. For example, although NR generally offers a significant energy efficiency improvement per gigabyte over previous generations (for example, LTE), new NR use cases that demand high data rates and/or the adoption of millimeter wave frequencies may require more network sites, greater network density, more network antennas, larger bandwidths, and/or more frequency bands, which could potentially lead to a more efficient wireless network that nonetheless has higher energy requirements and/or causes more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). Most energy consumption and/or energy costs come from powering a RAN, which accounts for about half of the energy consumed by a wireless network. Accordingly, measures to increase network energy savings and/or network energy efficiency are important factors that may drive adoption and/or expansion of wireless networks.

One way to increase energy efficiency in a RAN may be to adapt network energy consumption models to achieve more efficient operation dynamically and/or semi-statically. For example, power consumption in a RAN can generally be split into a dynamic portion, in which power is consumed only when data transmission and/or reception is ongoing, and a static portion, in which power is consumed all of the time to maintain the operation of radio access devices even when data transmission and/or reception is not ongoing. Accordingly, one potential approach to improve network energy savings may be to adapt power consumption models from the network perspective by reducing relative energy consumption for downlink and/or uplink communication (for example, considering factors such as power amplifier (PA) efficiency, quantities of transceiver units (TxRUs), and/or network load, among other examples), enabling network sleep states and associated transition times, and/or defining appropriate reference parameters and/or configurations.

In some cases, different NES states may be configured to enable granular adaptation of transmission and/or reception to reduce energy consumption using techniques in time, frequency, spatial, and/or power domains, with potential support and/or feedback from UEs (e.g., UE assistance information). However, a network node and a UE may need to exchange and/or coordinate information over a network interface, such as by exchanging control configurations, exchanging communication parameters, and/or coordinating network and UE behavior for each NES state. The exchange and/or coordination of information may increase configuration complexity and/or signaling overhead, which may pose challenges in reducing an impact on key performance indicators (KPIs) related to network and/or UE performance (e.g., spectral efficiency, latency, UE power consumption, and/or complexity, among other examples).

As shown in FIG. 3, a network node may be configured to operate in different NES states over time (shown on a horizontal axis of chart 302). Each NES state may use one or more techniques to adapt transmission and/or reception in time, frequency, spatial, and/or power domains based at least in part on power consumption (shown on a vertical axis of the chart 302). For example, as shown in FIG. 3, the NES states may include an active state (shown at a first time duration as active state 304-1 and a second time duration as active state 304-2), a light sleep NES state 306 and/or a deep sleep NES state 308. The active state may also be referred to as a normal operation mode, a legacy mode, and/or a default mode. In some aspects, the active state, the light sleep NES state and the deep sleep NES state may be associated with different levels of power consumption. To illustrate, a network node may consume more power while operating in the active state relative to operating in the light sleep NES state or the deep sleep NES state. Alternatively or additionally, the network node may consume less power while operating in the deep sleep NES state relative to the light sleep NES state and/or the active state. In some aspects, each NES state may provide different levels of access to a network interface.

A network node may transition between different NES states as shown by the chart 302 to reduce power consumption and maintain network operation in a manner that reduces an impact on KPIs, such as spectral efficiency, capacity, user perceived throughput (UPT), latency, UE power consumption, complexity, handover performance, call drop rate, initial access performance, and/or service level agreement (SLA) assurance. In some aspects, the network node may transition between different NES states based at least in part on traffic demands. To illustrate, the network node may enter a light sleep NES state based at least in part on detecting that current network traffic is slightly lower than peak traffic demands and/or enter a deep sleep NES state based at least in part on detecting that the current network traffic is much lower than peak traffic demands. As further described, each NES state may be associated with different energy saving techniques. For instance, the deep sleep NES state may be configured to reduce power consumption based at least in part on disabling one or more antenna panels, antenna ports, and/or radio frequency (RF) chains that may remain enabled in the light sleep NES state. Accordingly, as shown in FIG. 3, the active mode 304, the light sleep NES state 306, and the deep sleep NES state 308 may vary in terms of power consumption and may be associated with different transition times. For example, a first transition time 310 associated with transitioning to the deep sleep NES state 308 may be longer than a second transition time 312 associated with transitioning to the light sleep NES state 306) based at least in part on each NES state performing different energy saving techniques.

In some cases, an NES state (e.g., the light sleep NES state 306, the deep sleep NES state 308, and/or the active state 304) may generally correspond to a particular set of configurations, communication parameters, and/or UE behaviors. For example, an NES state may include a set of configurations, communication parameters, and/or UE behaviors associated with one or more energy saving techniques that are implemented in the time, frequency, spatial, and/or power domain to reduce energy consumption. To illustrate, a network node may be configured to not transmit a synchronization signal block (SSB) to reduce energy consumption in the light sleep NES state 306 (for example, an SSB-less NES state in which the network node refrains from transmitting an SSB), may turn off one or more antenna panels in the deep sleep NES state 308, and/or may operate with all supported functionality enabled in the active state 304. Accordingly, a network node may configure a semi-static pattern 314 to balance network energy savings with providing access to a wireless network. For example, as shown in FIG. 3, the semi-static pattern 314 (e.g., configured and/or indicated via radio resource control (RRC) signaling) may include a sequence of one or more NES states (e.g., any combination of the light sleep NES state 306, the deep sleep NES state 308, and/or the active state 304) that the network node may follow with a given periodicity 316.

In some aspects, the semi-static pattern 314 may include a flexible mode as shown in the example 300. During a time period associated with the flexible mode, the network node may dynamically select an NES state to transition to. For example, the network node may select an active state or a deep sleep NES state in the flexible mode time period based at least in part on current traffic conditions. As shown by the example 300, the network node may operate in accordance with the light sleep NES state 306 (shown as NES$_1$) for a first time period, operate in a flexible mode for a second time period, and operate in accordance with the deep sleep NES state 308 (shown as NES$_2$) for a third time period and then repeat operating in accordance with the pattern. That is, the network may repeat the sequence of NES states as shown by the periodicity 316.

As indicated above, FIG. 3 is provided as an example. Other examples may differ from what is described with regard to FIG. 3.

Figure 4:
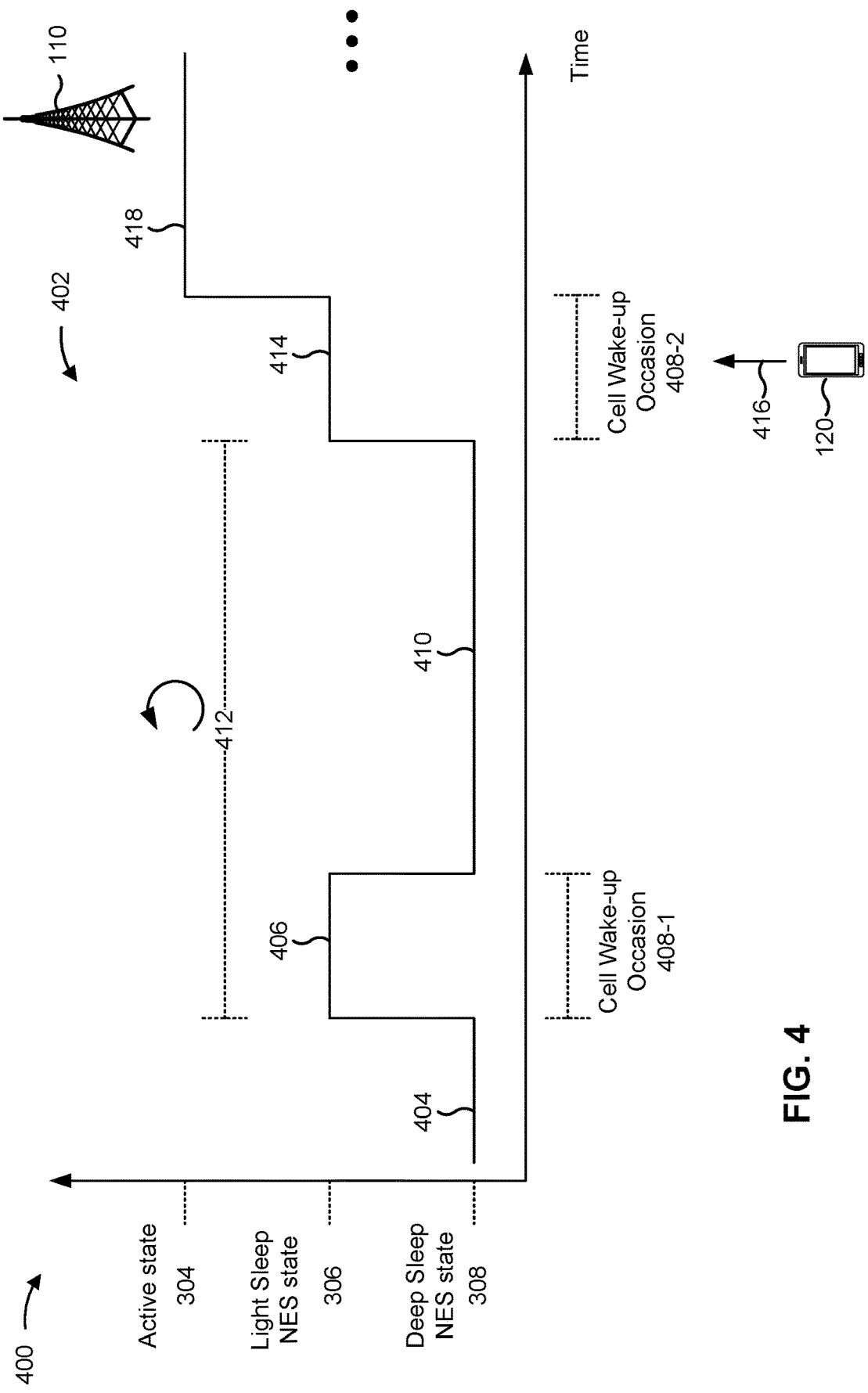
FIG. 4 is a diagram illustrating an example of a cell wake-up occasion, in accordance with the present disclosure.

FIG. 4 is a diagram illustrating an example 400 of a cell wake-up occasion, in accordance with the present disclosure.

A semi-static pattern, such as the semi-static pattern 314 as described with regard to FIG. 3, may be based at least in part on a cell wake-up occasion associated with a network node transitioning from one NES state (e.g., a deep sleep NES state) to another NES state (e.g., a light sleep NES state or an active state) to monitor for a cell wake-up signal (C-WUS) and/or to transmit a broadcast signal (e.g., an SSB). To illustrate, FIG. 4 includes a transition chart 402 that shows example transitions performed by a network node 110. While the transition chart 402 shows the network node 110 transitioning between the active state 304, the light sleep NES state 306, and the deep sleep NES state 308 as described with regard to FIG. 3, other examples may include alternate or additional states.

In some aspects, a network node (e.g., the network node 110) may experience a light traffic load (e.g., an amount of traffic that satisfies a light traffic threshold) and/or no traffic loads during certain time durations, such as during off-peak times. At such times, and as shown by reference number 404, the network node 110 may transition into the deep sleep NES state 308 based at least in part on reducing power consumption. However, the network node 110 may transition from the deep sleep NES state 308 to the light sleep NES state 306 to activate receiver hardware in order to monitor for a C-WUS, a random access channel (RACH), and/or a small data transmission (SDT) from a UE. For example, and as shown by reference number 406, the network node 110 may transition to the light sleep NES state 306 during an occurrence of a cell wake-up occasion (shown as cell wake-up occasion 408-1). As shown by reference number 410, the network node 110 may transition back to the deep sleep NES state 308 at the end of the cell wake-up occasion. For instance, the network node may not detect a C-WUS, RACH, and/or SDT from a UE 120, and determine to transition back to the deep sleep NES state 308. As shown by reference number 412, the network node 110 may periodically repeat transitioning to the light sleep NES state 306 during a cell wake-up occasion and transitioning back to the deep sleep NES state 308 at the end of the cell wake-up occasion. In some aspects, the network node 110 may extend a time duration between transitioning between NES states (e.g., extend the time duration between cell wake-up occasions) based at least in part on identifying a lack of connected UEs and/or a light traffic load.

As shown by reference number 414, the UE 120 may transmit a C-WUS 416 to the network node 110 during a cell wake-up occasion 408-2 and while the network node 110 operates in the light sleep NES state 306. For instance, the UE 120 may transmit the C-WUS 416 to indicate a request to transition into a connected state and/or a request for an access grant associated with a data transmission. To illustrate, the UE may transmit, as the C-WUS, a physical layer signal, such as a physical random access channel (PRACH) and/or a scheduling request (SR). Based at least in part on receiving the C-WUS 416, the network node may transmission out of the light sleep NES state 306 to the active state 304, as shown by reference number 418.

In some aspects, a network node transitioning from a deep sleep NES state to an active state may increase power consumption by the network node without benefit. For instance, during time durations associated with reduced and/or lack of traffic loads, a network node may transition to the active state to service a single UE. In such an instance, the transition power used by the network node (e.g., a first amount of power associated with transitioning from the deep sleep mode to the active state) may be large relative to the servicing power used by the network node (e.g., a second amount of power associated with communicating with and/or servicing the single UE). That is, the power overhead of transitioning to the active state may be larger than the servicing power. The disproportionate power consumption may increase network power consumption and/or negatively impact the network energy efficiency measures as described above, such as by increasing network operating costs, intensifying climate change, and/or reducing environmental sustainability.

Some techniques and apparatuses described herein provide delayed cell wake-up in response to a cell wake-up signal. In some aspects, a UE may transmit, in a cell wake-up occasion associated with a network node that is operating in a power saving mode, a C-WUS that indicates a latency tolerance priority associated with the UE. The UE may then communicate with the network node based at least in part on the network node transitioning from operating in the power saving mode (e.g., the deep sleep NES state or the light sleep NES state) to operating in an active state. To illustrate, a first UE communication, such as an IoT device communication, may be less affected by a servicing delay (e.g., a delay in being serviced by the network node) relative to an ultra-reliable low latency communication (URLLC) communication associated with a second device. Accordingly, the first UE may indicate a latency tolerance in a C-WUS to a network node, and the network node may use the latency tolerance to determine whether to delay transitioning to the active state. In some aspects, the network node may determine to wake up at a future point in time based at least in part on servicing multiple UEs at the future point in time (e.g., instead of a single UE). By delaying a transition to the active state, and coordinating multiple UEs for service at the future point in time (e.g., at a same time) the network node may reduce power consumption by reducing power overhead, reduce network operating costs, improve climate change mitigation by a wireless network, and/or improve environmental sustainability by the wireless network.

As indicated above, FIG. 4 is provided as an example. Other examples may differ from what is described with regard to FIG. 4.

Figure 5:
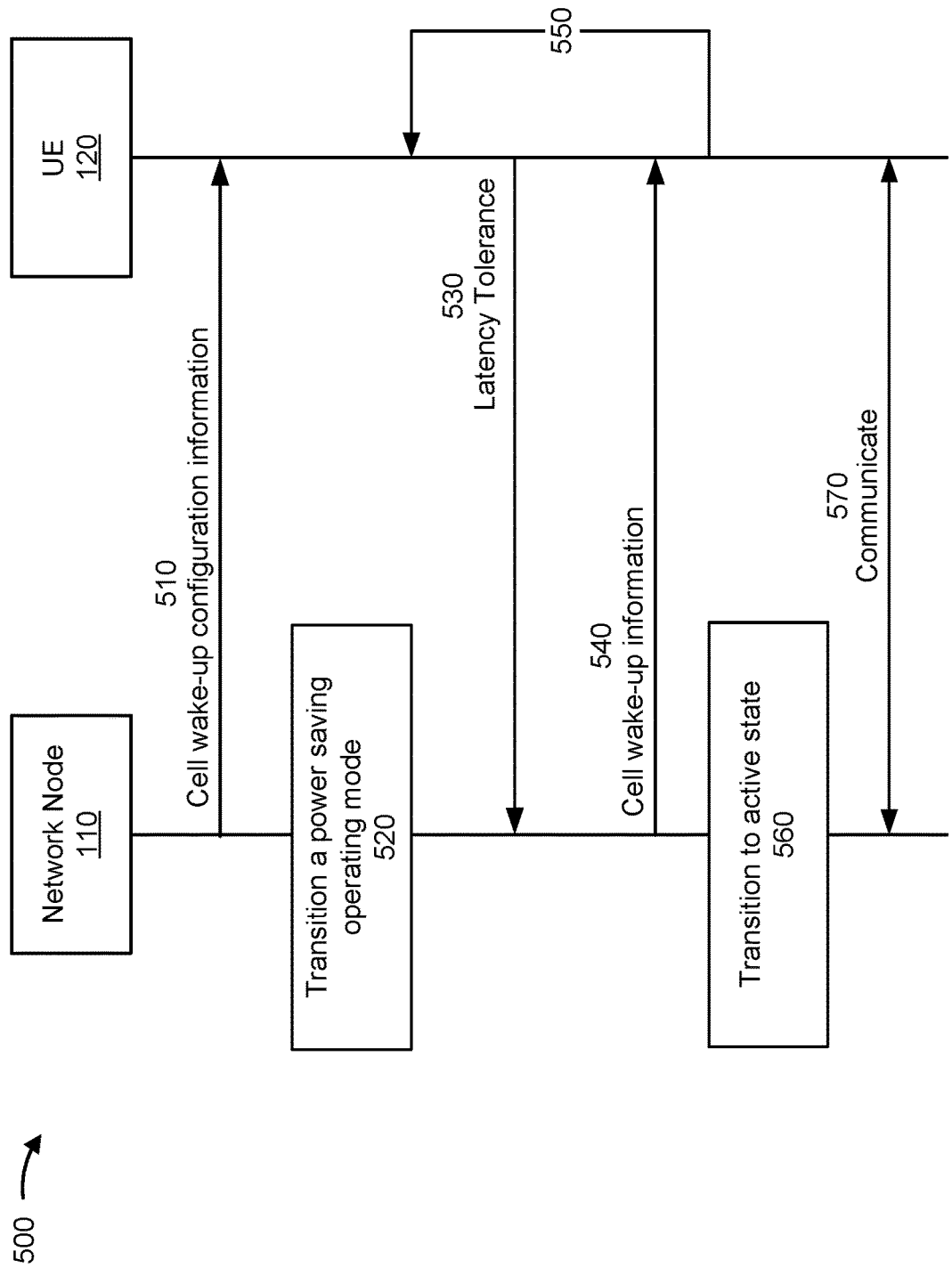
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 may transmit, and a UE 120 may receive, an indication of cell wake-up configuration information. The network node may transmit the indication of cell wake-up configuration information using any combination and/or type of signaling, such as a broadcast message, a unicast message, a multi-cast message, Layer 1 signaling (e.g., downlink control information (DCI), Layer 2 signaling (e.g., a medium access control (MAC) control element (CE)), and/or Layer 3 signaling (e.g., a radio resource control (RRC) message).

As one example, the network node may transmit an indication of one or more potential wake-up delay configurations. To illustrate, while operating in a power saving mode as further described below, the network node 110 may receive a C-WUS from the UE 120 in a first cell wake-up occasion and determine to delay a transition to the active mode (e.g., relative to the first cell wake-up occasion) by a number of cell wake-up occasions. The number of cell wake-up occasions associated with the delay may vary based at least in part on a variety of factors, such as a current number of C-WUSes received by the network node (e.g., from a same UE or different UEs), a projected volume of data traffic, and/or a traffic priority level. In some aspects, the network node may transmit, as at least part of the cell wake-up configuration information, an indication of multiple wake-up configurations, such as a delay table that maps a number of wake-up occasion cycles to a bit sequence (e.g., a first bit sequence indicates a single wake-up occasion cycle delay, a second bit sequence indicates a two wake-up occasion cycle delay, and/or a third bit sequence indicates a four wake-up occasion cycle delay). The transmission of the delay table may enable the network node 110 to quickly indicate the number of wake-up occasion cycles at a future point in time. To illustrate, the network node 110 may transmit one of the bit sequences that are included in the delay table in DCI to indicate the wake-up occasion cycle delay.

As another example of cell wake-up configuration information, the network node 110 may transmit an indication of a cell wake-up occasion periodicity, a cell wake-up occasion start time, and/or a cell wake-up occasion time duration. Alternatively or additionally, the network node 110 may transmit an indication of a mapping between a latency tolerance priority (and/or a latency tolerance) and a preamble (e.g., a signal and/or a sequence of bits that indicate a start of a transmission). For instance, the network node 110 may transmit a preamble table (or an indication of the preamble table) that maps one or more preambles to respective latency tolerance priorities and/or latency tolerances, and the UE 120 may select a preamble from the preamble table for a C-WUS, as further described below. In some aspects, a latency tolerance may be based at least in part on a time duration (e.g., 1 millisecond (msec), 10 msec, 50 msec, and/or 100 msec) and a latency tolerance priority may be associated with the time duration and/or the latency tolerance. For instance a low latency tolerance priority may be associated with a 100 msec latency tolerance, a medium latency tolerance priority may be associated with a 50 msec latency tolerance, and a high latency tolerance priority may be associated with a 1 msec latency tolerance. While described in terms of msec, a time duration may alternatively or additionally be indicated based on a time partition associated with a RAN (e.g., a time slot, a frame, and/or a mini-slot). A latency tolerance time duration and/or a mapping of a latency tolerance priority to a latency tolerance time duration may be specified by a communication standard or dynamically configured by a network node. As another example of cell wake-up configuration information, the network node 110 may indicate an instruction to monitor for an updated cell wake-up indication that indicates that the network node is transitioning to an active mode earlier than indicated by a first cell wake-up indication.

As shown by reference number 520, the network node 110 may transition into a power saving operating mode. To illustrate, the network node 110 may detect a trigger event associated with transitioning into the power saving operation mode, such as a first trigger event associated with a volume of traffic within a wireless network satisfying a light traffic threshold, a second trigger event associated with a current time of day that has historically been associated with off-peak traffic, and/or a third trigger event associated with a number of connected UEs satisfying a low connection threshold. In some aspects, the network node 110 may transition into a power saving operating mode that is associated with transitioning between different NES states, such as the NES states as described with regard to the semi-static pattern 314 of FIG. 3 and/or the transitions described with regard to the example 400 of FIG. 4. For instance, the power saving operating mode may be based at least in part on the network node 110 operating in a deep sleep NES state, periodically transitioning to a light sleep NES state (e.g., at a cell wake-up occasion), and transitioning to an active state mode based at least in part on latency tolerance information.

As shown by reference number 530, the UE 120 may transmit, and the network node 110 may receive, an indication of a latency tolerance and/or a latency tolerance priority. To illustrate, the UE 120 may transmit a C-WUS based at least in part on a cell wake-up occasion as described with regard to FIG. 4, and the C-WUS indicates the latency tolerance and/or the latency tolerance priority. As one example, the C-WUS may indicate and/or include a latency tolerance field, and the UE 120 may communicate, in the latency tolerance field, a value that indicates the latency tolerance. For instance, the UE 120 may transmit an SR that includes the latency tolerance field, and indicate a value in the latency tolerance field, such as a time duration, a number of slots, and/or a number of symbols associated with a latency that the UE 120 may tolerate in a communication (e.g., a latency in a communication that the UE may receive successfully). As another example, the UE 120 may transmit, as the C-WUS, a PRACH based at least in part on using a preamble that maps to the latency tolerance and/or a latency tolerance priority (e.g., a URLLC communication or not a URLLC communication). In some aspects, the UE 120 may select the preamble from a mapping indicated by the network node 110, as described with regard to reference number 510. Accordingly, the UE 120 may transmit, as part of the C-WUS, an indication of the latency tolerance and/or an indication of the latency tolerance priority.

As shown by reference number 540, the network node 110 may transmit, and the UE 120 may receive, a cell wake-up indication. To illustrate, the network node 110 may transmit the cell wake-up indication based at least in part on Layer 1 or Layer 2 signaling. In some aspects, the network node 110 may transition to an NES state that includes partial transmission functionality at the network node 110 (e.g., a light sleep NES state) during a cell wake-up occasion. The network node 110 may use the partial transmission functionality to transmit a cell wake-up indication that specifies a subsequent cell wake-up occasion (e.g., relative to a current cell wake-up occasion) in which the network node is scheduled to transition to the active state. For instance, the cell wake-up indication may specify a number of cell wake-up occasions based at least in part on a bit sequence indicated in a delay table, as further described herein. While the example 500 shows the network node 110 transmitting a cell wake-up indication, other examples may include the network node 110 not transmitting a cell wake-up indication.

In some aspects, the UE 120 may monitor for an updated cell wake-up indication from the network node. To illustrate, the UE 120 may receive a first cell wake-up indication from the network node that indicates the network node is scheduled to wake up X cell wake-up occasions in the future, where X is an integer. In some aspects, the UE may monitor for an updated cell wake-up indication from the network node that indicates the network node is scheduled to wake up earlier than the X cell wake-up occasions (e.g., earlier than indicated by the first cell wake-up indication). That is, the updated cell wake-up indication may indicate that the network node is transitioning to an active mode earlier than indicated by the first cell wake-up indication. In some aspects, the UE 120 may monitor for the updated cell wake-up indication based at least in part on receiving an instruction from the network node 110 (e.g., via RRC signaling, as described with regard to reference number 510). Alternatively or additionally, the UE 120 may determine a response to the first cell wake-up indication and/or the updated cell wake-up indication based at least in part on a UE-specific algorithm. As an example, a first UE may respond to the first cell wake-up indication based at least in part on a first UE-specific algorithm that indicates to operate an energy saving mode (e.g., disable and/or reduce power a transceiver until the network node is schedule to wake up) and a second UE may respond to the first cell wake-up indication based at least in part on a second UE-specific algorithm that indicates to maintain a current operating mode. In some aspects, the UE 120 may refrain from monitoring for an updated cell wake-up indication prior to the network node 110 transitioning to the active state.

As shown by reference number 550, the UE 120 may repeatedly transmit an indication of a latency tolerance. To illustrate, the UE 120 may transmit a respective C-WUS in each cell wake-up occasion that occurs between the first cell wake-up occasion (e.g., associated with the UE 120 transmitting a first C-WUS) and the network node transitioning to an active state. For instance, the UE 120 may transmit the first C-WUS based at least in part on the first cell wake-up occasion, a second C-WUS based at least in part on a second cell wake-up occasion, and/or a third C-WUS based at least in part on a third cell wake-up occasion, prior to the network node transitioning to an active state. In some aspects, the UE 120 may indicate a number of previous wake-up attempts and/or a number of previous C-WUSes transmitted by the UE 120 to the network node 110 in the respective C-WUS.

The UE 120 may transmit a respective C-WUS in each cell wake-up occasion that occurs prior to the network node transitioning to an active state, or the UE 120 may conditionally transmit a C-WUS in a cell wake-up occasion. That is, the UE 120 may transmit a respective C-WUS in only some of the subsequent cell wake-up occasions. Alternatively or additionally, the UE 120 may refrain from transmitting any additional C-WUSes. To illustrate, the UE 120 may conditionally refrain from transmitting an additional C-WUS based at least in part on a latency tolerance at the UE 120 remaining constant. That is, a latency tolerance priority associated with the UE 120 may not change prior to the network node 110 transitioning to the active state. Alternatively or additionally, the UE 120 may conditionally refrain from transmitting an additional C-WUS based at least in part on the scheduled time for the network node 110 transitioning to the active state satisfying the latency tolerance (e.g., the scheduled cell wake-up occasion for transitioning to the active state satisfies the latency tolerance). In some aspects, the UE may conditionally refrain from transmitting the additional C-WUS based at least in part on a buffer size associated with the UE (e.g., an amount of data for transmission at the UE) being constant. Alternatively or additionally, the UE 120 may conditionally refrain from transmitting the additional C-WUS based at least in part on conserving power, such as in a scenario where a UE battery level satisfies a low power threshold.

The UE 120 may transmit different latency tolerances and/or different latency tolerance priorities in different C-WUSes. For instance, the first C-WUS may indicate a first latency tolerance and a second, subsequent C-WUS may indicate a second latency tolerance that is different from the first latency tolerance. In some aspects, the UE 120 may conditionally transmit the second, subsequent C-WUS based at least in part on identifying that the second latency tolerance is different from the first latency tolerance. For example, the first latency tolerance may be based at least in part on a low priority communication and the second latency tolerance may be based at least in part on a high priority communication. To illustrate, the UE 120 may identify a change in a data priority, such as a data priority associated with first data stored in a data buffer at the UE and/or a data priority associated with second data that is expected by the UE. In some aspects, the UE 120 may indicate (e.g., in the second C-WUS) that the second latency tolerance has a higher priority relative to the first latency tolerance. As one example, the UE 120 may indicate a change in the latency tolerance priority by transmitting a different preamble. That is, the UE 120 may transmit the first C-WUS based at least in part on using a first preamble associated with an initial latency tolerance priority and/or an initial latency tolerance, and the second C-WUS based at least in part on using a second preamble that is associated with a second latency tolerance priority and/or a second latency tolerance. In some aspects, the UE 120 may select the first preamble and/or the second preamble based at least in part on cell wake-up configuration information indicated by the network node 110 as described with regard to reference number 510. Accordingly, the UE 120 may conditionally transmit a subsequent C-WUS based at least in part on a latency tolerance and/or a latency tolerance priority at the UE 120 changing.

While the example 500 shows that the UE 120 may repeatedly transmit an indication of a latency tolerance, other examples may include the UE 120 transmitting a single indication of a latency tolerance. To illustrate, the UE 120 may transmit a single C-WUS that indicates the latency tolerance, and refrain from transmitting an additional C-WUS that indicates an additional and/or a same latency tolerance. In some aspects, the network node 110 may transmit one or more additional indications of cell wake-up information, such as when the network node 110 determines to change a scheduled time associated with the network node 110 transitioning to an active state as further described below. However, in other examples, the network node 110 may refrain from transmitting additional cell wake-up information.

As shown by reference number 560, the network node 110 may transition to an active state. As one example, the network node 110 may transition to the active state in a first cell wake-up occasion that is used to receive the first and/or single C-WUS from the UE 120. As another example, the network node 110 may transition to the active state at a subsequent cell wake-up occasion, such as a scheduled time indicated in the cell wake-up information as described with regard to the reference number 540. In some aspects, the network node 110 may transition to the active state after the first cell wake-up occasion but prior to the scheduled time. To illustrate, the network node 110 may initially select the scheduled time for transitioning to the active state based at least in part on receiving an indication, via the C-WUS from the UE 120, that a first communication is associated with a low latency tolerance priority and/or a high latency tolerance communication. After selecting the scheduled time, the network node may receive a second C-WUS (e.g., at a subsequent cell wake-up occasion prior to the transition to active state) that indicates that the UE 120 (or another UE) is associated with a second communication that has a higher priority latency and/or a lower latency tolerance relative to the first communication. Accordingly, the second C-WUS may be transmitted by the UE 120 or another UE. The network node 110 may determine to transition to the active state earlier than the scheduled time based at least in part on the second communication and, in some aspects, indicate to the UE 120 that the network node 110 has transitioned to the active state (e.g., earlier than the scheduled time).

As shown by reference number 570, the network node 110 and the UE 120 may communicate with one another based at least in part on the indication of the latency tolerance. That is, the network node 110 and the UE 120 may communicate with one another based at least in part on the network node 110 transitioning to an active state based at least in part on the latency tolerance as further described herein. To illustrate, based at least in part on transitioning to the active state, the network node 110 may schedule a downlink grant and/or an uplink grant to the UE 120, and communicate with the UE 120 using a wireless network and the grant(s).

A UE may indicate a latency tolerance in a C-WUS to a network node that enables the network node to determine whether to delay transitioning to the active state. In some aspects, the network node may determine to wake up at a future point in time based at least in part on servicing multiple UEs at the future point in time. By delaying a transition to the active state, and coordinating multiple UEs for service at the future point in time (e.g., at a same time), the network node may reduce power consumption by reducing power overhead, reduce network operating costs, improve climate change mitigation by a wireless network, and/or improve environmental sustainability by the wireless network.

As indicated above, FIG. 5 is provided as an example. Other examples may differ from what is described with regard to FIG. 5.

Figure 6:
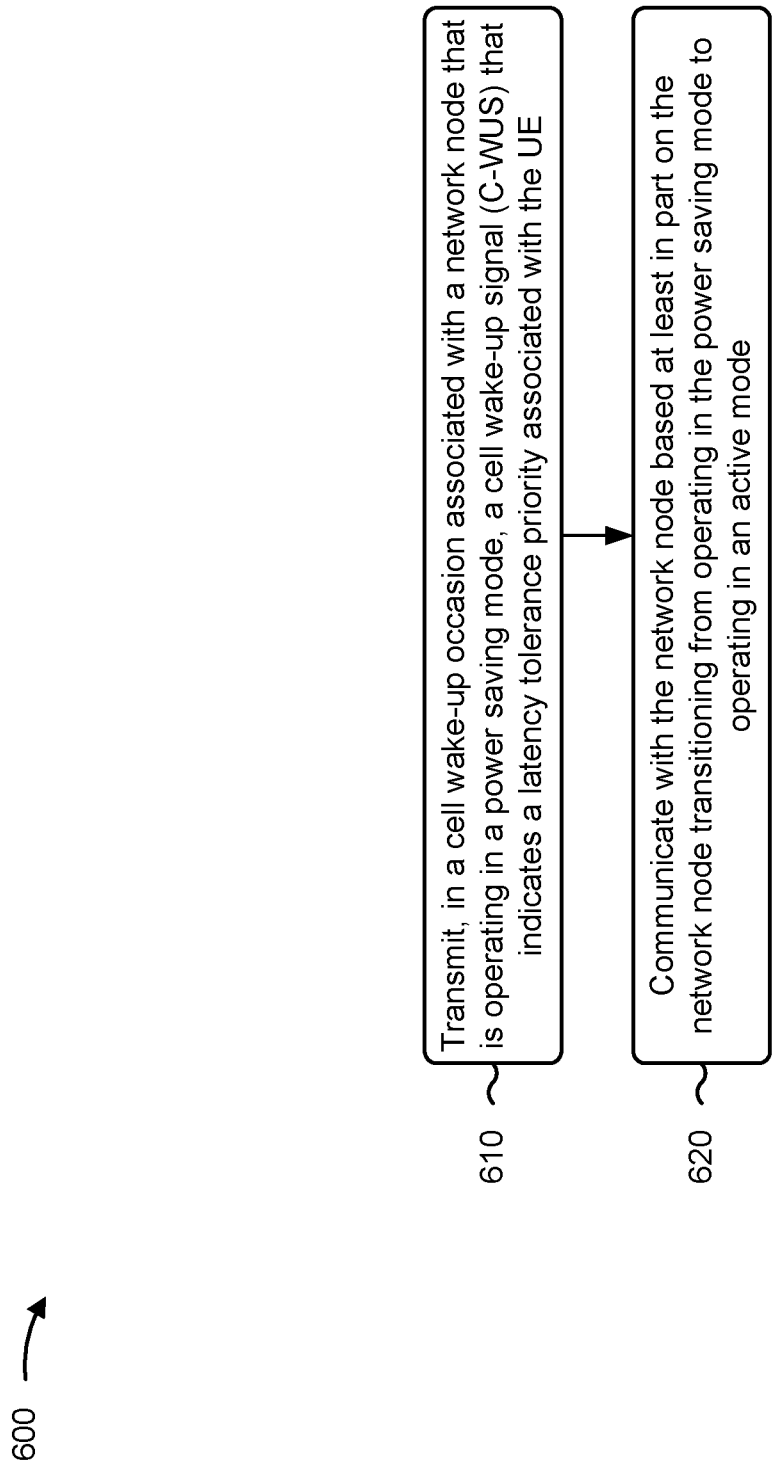
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., the UE 120) performs operations associated with delayed cell wake-up in response to a cell wake-up signal.

As shown in FIG. 6, in some aspects, process 600 may include transmitting, in a cell wake-up occasion associated with a network node that is operating in a power saving mode, a C-WUS that indicates a latency tolerance priority associated with the UE (block 610). For example, the UE (e.g., using communication manager 140 and/or transmission component 804, depicted in FIG. 8) may transmit, in a cell wake-up occasion associated with a network node that is operating in a power saving mode, a C-WUS that indicates a latency tolerance priority associated with the UE, as described above.

As further shown in FIG. 6, in some aspects, process 600 may include communicating with the network node based at least in part on the network node transitioning from operating in the power saving mode to operating in an active mode (block 620). For example, the UE (e.g., using communication manager 140 and/or cell wake-up manager component 808, depicted in FIG. 8) may communicate with the network node based at least in part on the network node transitioning from operating in the power saving mode to operating in an active mode, as described above.

Process 600 may include additional aspects, such as any single aspect or any combination of aspects described below and/or in connection with one or more other processes described elsewhere herein.

In a first aspect, communicating with the network node includes communicating with the network node based at least in part on the network node transitioning to the active mode during the cell wake-up occasion.

In a second aspect, the cell wake-up occasion is a first cell wake-up occasion, the C-WUS is a first C-WUS, and process 600 includes transmitting, prior to the network node transitioning to the active mode, a second C-WUS to the network node based at least in part on a second cell wake-up occasion.

In a third aspect, the latency tolerance priority is a first latency tolerance priority, and the second C-WUS indicates a second latency tolerance priority that is different from the first latency tolerance priority.

In a fourth aspect, the second latency tolerance priority indicates a higher priority than the first latency tolerance priority.

In a fifth aspect, the first C-WUS or the second C-WUS includes an explicit indication of a latency tolerance priority.

In a sixth aspect, transmitting the first C-WUS includes transmitting the first C-WUS using a first preamble that is based at least in part on the first latency tolerance priority, and transmitting the second C-WUS includes transmitting the second C-WUS using a second preamble that is based at least in part on the second latency tolerance priority.

In a seventh aspect, the cell wake-up occasion is a first cell wake-up occasion, and communicating with the network node includes communicating with the network node based at least in part on the network node transitioning to the active mode at a subsequent cell wake-up occasion that occurs after the first cell wake-up occasion.

In an eighth aspect, the cell wake-up occasion is a first cell wake-up occasion, and process 600 includes receiving a cell wake-up indication that indicates a subsequent cell wake-up occasion associated with the network node transitioning to the active mode.

In a ninth aspect, the cell wake-up indication specifies a number of cell wake-up occasions.

In a tenth aspect, receiving the cell wake-up indication is based at least in part on a radio resource control message.

In an eleventh aspect, process 600 includes refraining from transmitting an additional C-WUS to the network node.

In a twelfth aspect, refraining from transmitting the additional C-WUS to the network node includes conditionally refraining from transmitting the additional C-WUS to the network node based at least in part on at least one of a buffer size associated with the UE, the latency tolerance priority, or a UE battery level.

In a thirteenth aspect, the C-WUS is a first C-WUS, and process 600 includes transmitting, prior to the subsequent cell wake-up occasion, a second C-WUS to the network node based at least in part on a data priority.

In a fourteenth aspect, the data priority is associated with at least one of first data stored in a data buffer associated with the UE, or second data that is expected by the UE.

In a fifteenth aspect, process 600 includes determining a response to the cell wake-up indication based at least in part on a UE-specific algorithm.

In a sixteenth aspect, process 600 includes monitoring for an updated cell wake-up indication that indicates the network node is transitioning to an active mode earlier than indicated by the first cell wake-up indication.

In a seventeenth aspect, monitoring for the updated cell wake-up indication is based at least in part on receiving an instruction to monitor the one or more additional wake-up occasions.

In an eighteenth aspect, process 600 includes receiving the instruction based at least in part on a radio resource control message.

In a nineteenth aspect, the C-WUS indicates a number of previous wake-up attempts.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
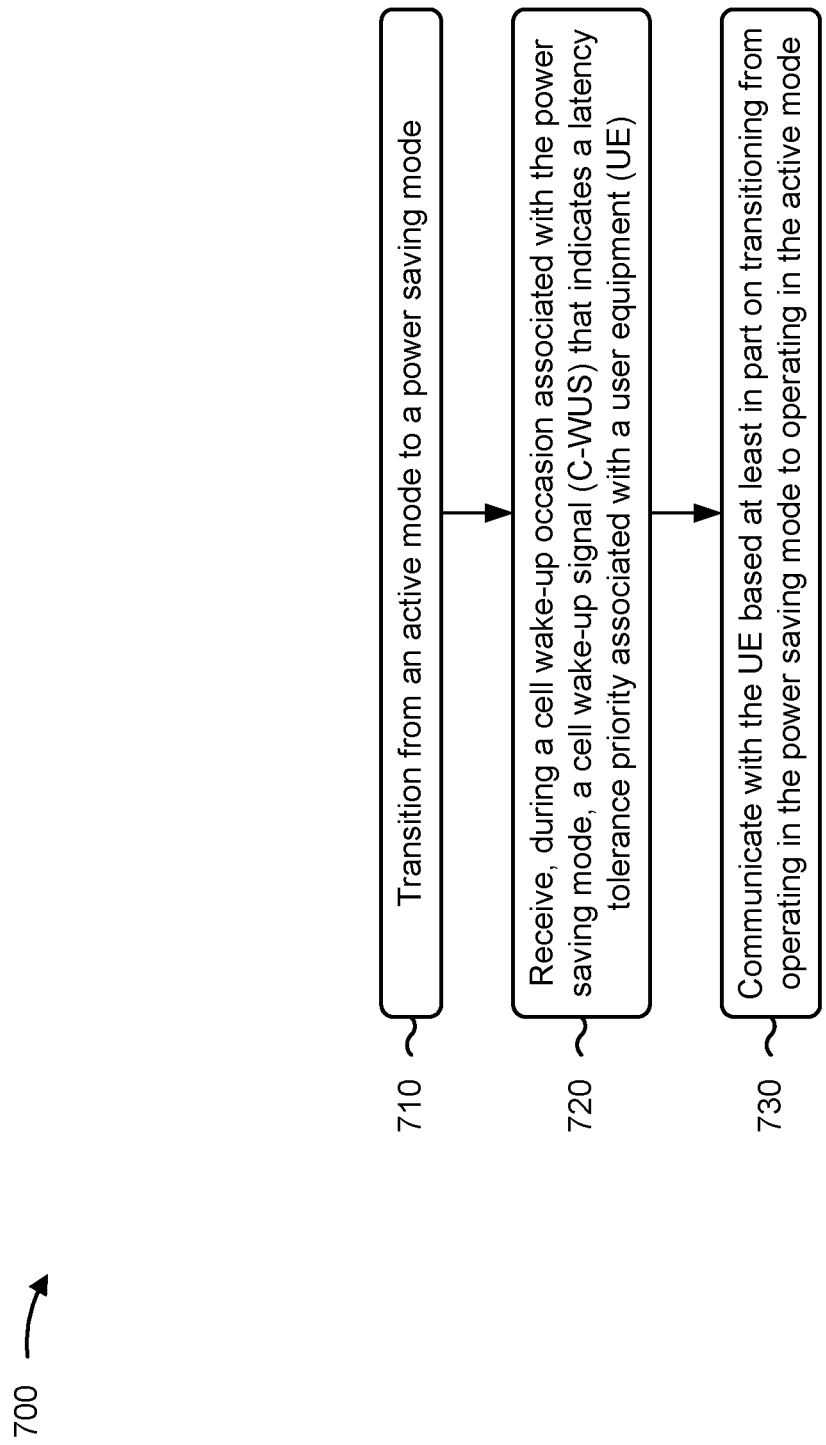
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with delayed cell wake-up in response to a cell wake-up signal.

As shown in FIG. 7, in some aspects, process 700 may include transitioning from an active mode to a power saving mode (block 710). For example, the network node (e.g., using communication manager 150 and/or cell wake-up manager component 908, depicted in FIG. 9) may transition from an active mode to a power saving mode, as described above.

As further shown in FIG. 7, in some aspects, process 700 may include receiving, during a cell wake-up occasion associated with the power saving mode, a C-WUS that indicates a latency tolerance priority associated with a UE (block 720). For example, the network node (e.g., using communication manager 150 and/or reception component 902, depicted in FIG. 9) may receive, during a cell wake-up occasion associated with the power saving mode, a C-WUS that indicates a latency tolerance priority associated with a UE, as described above.

As further shown in FIG. 7, in some aspects, process 700 may include communicating with the UE based at least in part on transitioning from operating in the power saving mode to operating in the active mode (block 730). For example, the network node (e.g., using communication manager 150 and/or cell wake-up manager component 908, depicted in FIG. 9) may communicate with the UE based at least in part on transitioning from operating in the power saving mode to operating in the active mode, as described above.

Process 700 may include additional aspects, such as any single aspect or any combination of aspects described below and/or in connection with one or more other processes described elsewhere herein.

In a first aspect, process 700 includes transitioning to the active mode during the cell wake-up occasion.

In a second aspect, the cell wake-up occasion is a first cell wake-up occasion, the C-WUS is a first C-WUS, and process 700 includes receiving, prior to transitioning to the active mode, a second C-WUS based at least in part on a second cell wake-up occasion.

In a third aspect, the latency tolerance priority is a first latency tolerance priority, and the second C-WUS indicates a second latency tolerance priority that is different from the first latency tolerance priority.

In a fourth aspect, the second latency tolerance priority indicates a higher priority than the first latency tolerance priority.

In a fifth aspect, the first C-WUS or the second C-WUS includes an explicit indication of a latency tolerance priority.

In a sixth aspect, process 700 includes receiving the first C-WUS based at least in part on a first preamble that is associated with the first latency tolerance priority, and receiving the second C-WUS based at least in part on a second preamble that is different from the first preamble.

In a seventh aspect, the cell wake-up occasion is a first cell wake-up occasion, and communicating with the UE includes communicating with the UE based at least in part on transitioning to the active mode at a subsequent cell wake-up occasion that occurs after the first cell wake-up occasion.

In an eighth aspect, process 700 includes transmitting a cell wake-up indication that indicates a subsequent cell wake-up occasion associated with transitioning to the active mode.

In a ninth aspect, the cell wake-up indication specifies a number of cell wake-up occasions.

In a tenth aspect, transmitting the cell wake-up indication is based at least in part on a radio resource control message.

In an eleventh aspect, the C-WUS is a first C-WUS, and process 700 includes receiving, prior to the subsequent cell wake-up occasion, a second C-WUS from the UE.

In a twelfth aspect, process 700 includes transmitting an instruction to monitor one or more additional wake-up occasions.

In a thirteenth aspect, transmitting the instruction further includes transmitting the instruction based at least in part on a radio resource control message.

In a fourteenth aspect, the C-WUS indicates a number of previous wake-up attempts.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
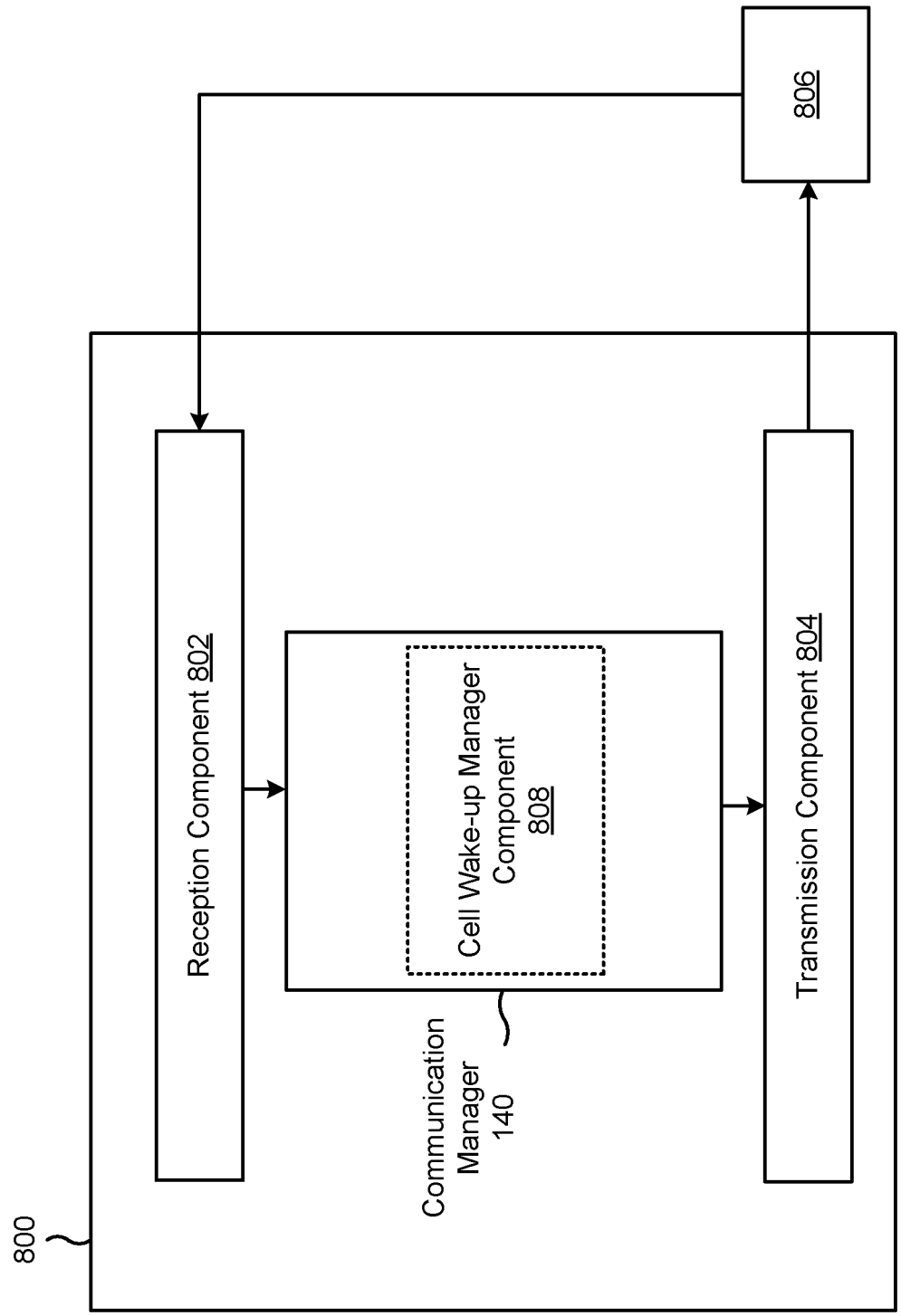
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a cell wake-up manager component 808, among other examples.

In some aspects, the apparatus 800 may be configured to perform one or more operations described herein in connection with FIGS. 5-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The cell wake-up manager component 808 may transmit, by way of the transmission component 804 and in a cell wake-up occasion associated with a network node that is operating in a power saving mode, a C-WUS that indicates a latency tolerance priority associated with the UE. The cell wake-up manager component 808 may communicate with the network node based at least in part on the network node transitioning from operating in the power saving mode to operating in an active mode.

The cell wake-up manager component 808 may refrain from transmitting an additional C-WUS to the network node. Alternatively or additionally, the cell wake-up manager component 808 may determine a response to the cell wake-up indication based at least in part on a UE-specific algorithm.

The cell wake-up manager component 808 may monitor one or more additional wake-up occasions that occur after the first cell wake-up occasion for an active mode indication from the network node.

The cell wake-up manager component 808 may receive, by way of the reception component 802, the instruction based at least in part on a radio resource control message.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
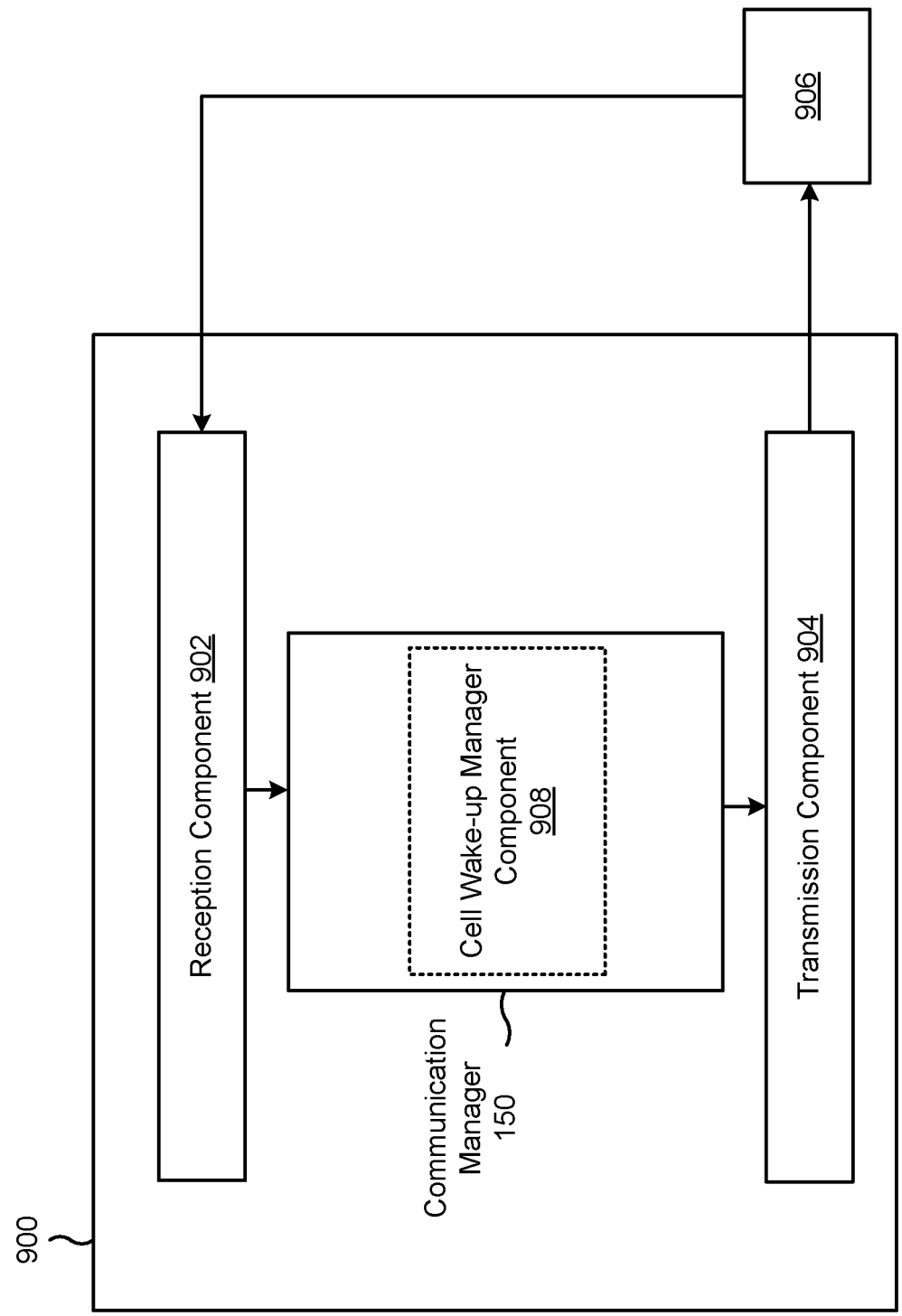
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150) may include one or more of a cell wake-up manager component 908, among other examples.

In some aspects, the apparatus 900 may be configured to perform one or more operations described herein in connection with FIGS. 5-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The cell wake-up manager component 908 may transition from an active mode to a power saving mode. The cell wake-up manager component 908 may receive, by way of the reception component 902 and during a cell wake-up occasion associated with the power saving mode, a C-WUS that indicates a latency tolerance priority associated with a UE. The cell wake-up manager component 908 may communicate with the UE based at least in part on transitioning from operating in the power saving mode to operating in the active mode. In some aspects, the cell wake-up manager component 908 may transition to the active mode during the cell wake-up occasion. In other aspects, the cell wake-up manager component 908 may delay the transition to the active mode to a subsequent cell wake-up occasion.

The cell wake-up manager component 908 may receive, by way of the reception component 902, a first C-WUS based at least in part on a first preamble that is associated with the first latency tolerance priority. Alternatively or additionally, the cell wake-up manager component 908 may receive, by way of the reception component 902, a second C-WUS based at least in part on a second preamble that is different from the first preamble.

The cell wake-up manager component 908 may transmit, by way of the transmission component 904, a cell wake-up indication that indicates a subsequent cell wake-up occasion associated with transitioning to the active mode. Alternatively or additionally, the cell wake-up manager component 908 may transmit, by way of the transmission component 904, an instruction to monitor one or more additional wake-up occasions.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by an apparatus of a user equipment (UE), comprising: transmitting, in a cell wake-up occasion associated with a network node that is operating in a power saving mode, a cell wake-up signal (C-WUS) that indicates a latency tolerance priority associated with the UE; and communicating with the network node based at least in part on the network node transitioning from operating in the power saving mode to operating in an active mode.

Aspect 2: The method of Aspect 1, wherein communicating with the network node comprises: communicating with the network node based at least in part on the network node transitioning to the active mode during the cell wake-up occasion.

Aspect 3: The method of Aspect 1, wherein the cell wake-up occasion is a first cell wake-up occasion, the C-WUS is a first C-WUS, and the method further comprises: transmitting, prior to the network node transitioning to the active mode, a second C-WUS to the network node based at least in part on a second cell wake-up occasion.

Aspect 4: The method of Aspect 3, wherein the latency tolerance priority is a first latency tolerance priority, and the second C-WUS indicates a second latency tolerance priority that is different from the first latency tolerance priority.

Aspect 5: The method of Aspect 4, wherein the second latency tolerance priority indicates a higher priority than the first latency tolerance priority.

Aspect 6: The method of Aspect 5, wherein the first C-WUS or the second C-WUS includes an explicit indication of at least one of the first latency tolerance priority or the second latency tolerance priority.

Aspect 7: The method of Aspect 4, wherein transmitting the first C-WUS comprises transmitting the first C-WUS using a first preamble that is based at least in part on the first latency tolerance priority, and wherein transmitting the second C-WUS comprises transmitting the second C-WUS using a second preamble that is based at least in part on the second latency tolerance priority.

Aspect 8: The method of any one of Aspects 1-7, wherein the cell wake-up occasion is a first cell wake-up occasion, and communicating with the network node comprises: communicating with the network node based at least in part on the network node transitioning to the active mode at a subsequent cell wake-up occasion that occurs after the first cell wake-up occasion.

Aspect 9: The method of any one of Aspects 1-8, wherein the cell wake-up occasion is a first cell wake-up occasion, and the method further comprises: receiving a cell wake-up indication that indicates a subsequent cell wake-up occasion associated with the network node transitioning to the active mode.

Aspect 10: The method of Aspect 9, wherein the cell wake-up indication specifies a number of cell wake-up occasions.

Aspect 11: The method of Aspect 9 or Aspect 10, wherein receiving the cell wake-up indication is based at least in part on a radio resource control message.

Aspect 12: The method of any one of Aspects 9-11, further comprising: refraining from transmitting an additional C-WUS to the network node.

Aspect 13: The method of Aspect 12, wherein refraining from transmitting the additional C-WUS to the network node comprises: conditionally refraining from transmitting the additional C-WUS to the network node based at least in part on at least one of: a buffer size associated with the UE, the latency tolerance priority, or a UE battery level.

Aspect 14: The method of Aspect 9 or Aspect 10, wherein the C-WUS is a first C-WUS, and the method further comprises: transmitting, prior to the subsequent cell wake-up occasion, a second C-WUS to the network node based at least in part on a data priority.

Aspect 15: The method of Aspect 14, wherein the data priority is associated with at least one of: first data stored in a data buffer associated with the UE, or second data that is expected by the UE.

Aspect 16: The method of any one of Aspects 9-15, further comprising: determining a response to the cell wake-up indication based at least in part on a UE-specific algorithm.

Aspect 17: The method of any one of Aspects 9-16, further comprising: monitoring for an updated cell wake-up indication that indicates the network node is transitioning to an active mode earlier than indicated by the first cell wake-up indication.

Aspect 18: The method of Aspect 17, wherein monitoring for the updated cell wake-up indication is based at least in part on receiving an instruction to monitor the one or more additional wake-up occasions.

Aspect 19: The method of Aspect 18, further comprising: receiving the instruction based at least in part on a radio resource control message.

Aspect 20: The method of any one of Aspects 1-19, wherein the C-WUS indicates a number of previous wake-up attempts.

Aspect 21: A method of wireless communication performed by an apparatus of a network node, comprising: transitioning from an active mode to a power saving mode; receiving, during a cell wake-up occasion associated with the power saving mode, a cell wake-up signal (C-WUS) that indicates a latency tolerance priority associated with a user equipment (UE); and communicating with the UE based at least in part on transitioning from operating in the power saving mode to operating in the active mode.

Aspect 22: The method of Aspect 21, further comprising: transitioning to the active mode during the cell wake-up occasion.

Aspect 23: The method of Aspect 21, wherein the cell wake-up occasion is a first cell wake-up occasion, the C-WUS is a first C-WUS, and the method further comprises: receiving, prior to transitioning to the active mode, a second C-WUS based at least in part on a second cell wake-up occasion.

Aspect 24: The method of Aspect 23, wherein the latency tolerance priority is a first latency tolerance priority, and the second C-WUS indicates a second latency tolerance priority that is different from the first latency tolerance priority.

Aspect 25: The method of Aspect 24, wherein the second latency tolerance priority indicates a higher priority than the first latency tolerance priority.

Aspect 26: The method of Aspect 24 or Aspect 25, wherein the first C-WUS or the second C-WUS includes an explicit indication of a latency tolerance priority.

Aspect 27: The method of Aspect 26, further comprising: receiving the first C-WUS based at least in part on a first preamble that is associated with a first latency tolerance priority, and receiving the second C-WUS based at least in part on a second preamble that is different from the first preamble.

Aspect 28: The method of any one of Aspects 21-27, wherein the cell wake-up occasion is a first cell wake-up occasion, and communicating with the UE comprises: communicating with the UE based at least in part on transitioning to the active mode at a subsequent cell wake-up occasion that occurs after the first cell wake-up occasion.

Aspect 29: The method of Aspect 28, further comprising: transmitting a cell wake-up indication that indicates a subsequent cell wake-up occasion associated with transitioning to the active mode.

Aspect 30: The method of Aspect 29, wherein the cell wake-up indication specifies a number of cell wake-up occasions.

Aspect 31: The method of Aspect 29 or Aspect 30, wherein transmitting the cell wake-up indication is based at least in part on a radio resource control message.

Aspect 32: The method of any one of Aspects 29-31, wherein the C-WUS is a first C-WUS, and the method further comprises: receiving, prior to the subsequent cell wake-up occasion, a second C-WUS from the UE.

Aspect 33: The method of any one of Aspects 29-32, further comprising: transmitting an instruction to monitor one or more additional wake-up occasions.

Aspect 34: The method of Aspect 33, wherein transmitting the instruction further comprises: transmitting the instruction based at least in part on a radio resource control message.

Aspect 35: The method of any one of Aspects 21-34, wherein the C-WUS indicates a number of previous wake-up attempts.

Aspect 36: An apparatus for wireless communication at a device, comprising a processor; memory coupled with the processor; and instructions stored in the memory and executable by the processor to cause the apparatus to perform the method of one or more of Aspects 1-20.

Aspect 37: An apparatus for wireless communication at a device, comprising a processor; memory coupled with the processor; and instructions stored in the memory and executable by the processor to cause the apparatus to perform the method of one or more of Aspects 21-35.

Aspect 38: A device for wireless communication, comprising a memory and one or more processors coupled to the memory, the one or more processors configured to perform the method of one or more of Aspects 1-20.

Aspect 39: A device for wireless communication, comprising a memory and one or more processors coupled to the memory, the one or more processors configured to perform the method of one or more of Aspects 21-35.

Aspect 40: An apparatus for wireless communication, comprising at least one means for performing the method of one or more of Aspects 1-20.

Aspect 41: An apparatus for wireless communication, comprising at least one means for performing the method of one or more of Aspects 21-35.

Aspect 42: A non-transitory computer-readable medium storing code for wireless communication, the code comprising instructions executable by a processor to perform the method of one or more of Aspects 1-20.

Aspect 43: A non-transitory computer-readable medium storing code for wireless communication, the code comprising instructions executable by a processor to perform the method of one or more of Aspects 21-35.

Aspect 44: A non-transitory computer-readable medium storing a set of instructions for wireless communication, the set of instructions comprising one or more instructions that, when executed by one or more processors of a device, cause the device to perform the method of one or more of Aspects 1-20.

Aspect 45: A non-transitory computer-readable medium storing a set of instructions for wireless communication, the set of instructions comprising one or more instructions that, when executed by one or more processors of a device, cause the device to perform the method of one or more of Aspects 21-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured individually or in any combination to:
   transmit, in a first cell wake-up occasion associated with a network node that is operating in a power saving mode, a cell wake-up signal (C-WUS) that indicates a latency tolerance priority associated with the UE;
   receive a cell wake-up indication that indicates a subsequent cell wake-up occasion associated with the network node transitioning from operating in the power saving mode to operating in an active mode; and
   communicate with the network node based at least in part on the network node transitioning from operating in the power saving mode to operating in the active mode.

2. The apparatus of claim 1, wherein C-WUS is a first C-WUS, and the one or more processors are further configured to:
   transmit, prior to the network node transitioning to the active mode, a second C-WUS to the network node based at least in part on a second cell wake-up occasion.

3. The apparatus of claim 2, wherein the latency tolerance priority is a first latency tolerance priority, and the second C-WUS indicates a second latency tolerance priority that is different from the first latency tolerance priority.

4. The apparatus of claim 3, wherein the second latency tolerance priority indicates a higher priority than the first latency tolerance priority.

5. The apparatus of claim 3, wherein the one or more processors, to transmit the first C-WUS, are configured to transmit the first C-WUS using a first preamble that is based at least in part on the first latency tolerance priority, and
wherein the one or more processors, to transmit the second C-WUS, are configured to transmit the second C-WUS using a second preamble that is based at least in part on the second latency tolerance priority.

6. The apparatus of claim 1, wherein the cell wake-up indication further specifies a number of cell wake-up occasions.

7. The apparatus of claim 1, wherein the one or more processors are further configured to:
refrain from transmitting an additional C-WUS to the network node.

8. The apparatus of claim 7, wherein the one or more processors, to refrain from transmitting the additional C-WUS to the network node, are configured to:
conditionally refrain from transmitting the additional C-WUS to the network node based at least in part on at least one of:
a buffer size associated with the UE,
the latency tolerance priority, or
a UE battery level.

9. The apparatus of claim 1, wherein the one or more processors are further configured to:
transmit, prior to the subsequent cell wake-up occasion, a second C-WUS to the network node based at least in part on a data priority.

10. The apparatus of claim 1, wherein the one or more processors are further configured to:
monitor for an updated cell wake-up indication that indicates the network node is transitioning to the active mode earlier than indicated by the first cell wake-up indication.

11. The apparatus of claim 1, wherein the C-WUS indicates a number of previous wake-up attempts.

12. An apparatus for wireless communication at a network node, comprising:
a memory; and
one or more processors, coupled to the memory, configured individually or in any combination to:
transition from an active mode to a power saving mode;
receive, during a first cell wake-up occasion associated with the power saving mode, a cell wake-up signal (C-WUS) that indicates a latency tolerance priority associated with a user equipment (UE);
transmit a cell wake-up indication that indicates a subsequent cell wake-up occasion associated with transitioning from operating in the power saving mode to operating in the active mode; and
communicate with the UE based at least in part on transitioning from operating in the power saving mode to operating in the active mode.

13. The apparatus of claim 12, wherein the C-WUS is a first C-WUS, and the one or more processors are further configured to:
receive, prior to transitioning to the active mode, a second C-WUS based at least in part on a second cell wake-up occasion.

14. The apparatus of claim 13, wherein the latency tolerance priority is a first latency tolerance priority, and the second C-WUS indicates a second latency tolerance priority that is different from the first latency tolerance priority.

15. The apparatus of claim 13, wherein the one or more processors are further configured to:
receive the first C-WUS based at least in part on a first preamble that is associated with a first latency tolerance priority, and
receive the second C-WUS based at least in part on a second preamble that is different from the first preamble, the second preamble being associated with a second latency tolerance priority.

16. The apparatus of claim 12, wherein the one or more processors are further configured to:
communicate with the UE based at least in part on transitioning to the active mode at a subsequent cell wake-up occasion that occurs after the first cell wake-up occasion.

17. The apparatus of claim 12, wherein the cell wake-up indication further specifies a number of cell wake-up occasions.

18. The apparatus of claim 12, wherein the C-WUS is a first C-WUS, and the one or more processors are further configured to:
receive, prior to the subsequent cell wake-up occasion, a second C-WUS from the UE.

19. The apparatus of claim 12, wherein the one or more processors are further configured to:
transmit an instruction to monitor one or more additional cell wake-up occasions.

20. The apparatus of claim 12, wherein the C-WUS indicates a number of previous wake-up attempts.

21. A method of wireless communication performed by an apparatus of a user equipment (UE), comprising:
transmitting, in a first cell wake-up occasion associated with a network node that is operating in a power saving mode, a cell wake-up signal (C-WUS) that indicates a latency tolerance priority associated with the UE;
receiving a cell wake-up indication that indicates a subsequent cell wake-up occasion associated with the network node transitioning from operating in the power saving mode to operating in an active mode; and
communicating with the network node based at least in part on the network node transitioning from operating in the power saving mode to operating in the active mode.

22. The method of claim 21, wherein the C-WUS is a first C-WUS, and the method further comprises:
transmitting, prior to the network node transitioning to the active mode, a second C-WUS to the network node based at least in part on a second cell wake-up occasion.

23. The method of claim 21, wherein communicating with the network node comprises:
communicating with the network node based at least in part on the network node transitioning to the active mode at a subsequent cell wake-up occasion that occurs after the first cell wake-up occasion.

24. A method of wireless communication performed by an apparatus of a network node, comprising:
transitioning from an active mode to a power saving mode;
receiving, during a first cell wake-up occasion associated with the power saving mode, a cell wake-up signal (C-WUS) that indicates a latency tolerance priority associated with a user equipment (UE);
transmitting a cell wake-up indication that indicates a subsequent cell wake-up occasion associated with transitioning from operating in the power saving mode to operating in the active mode; and communicating with the UE based at least in part on transitioning from operating in the power saving mode to operating in the active mode.

25. The method of claim 24, wherein communicating with the UE comprises:
communicating with the UE based at least in part on transitioning to the active mode at a subsequent cell wake-up occasion that occurs after the first cell wake-up occasion.

26. The method of claim 24, wherein the C-WUS indicates a number of previous wake-up attempts.

* * * * *